(12) United States Patent
Holm

(10) Patent No.: US 8,847,422 B2
(45) Date of Patent: Sep. 30, 2014

(54) WIND POWER STATION

(75) Inventor: Patrik Holm, Vaasa (FI)

(73) Assignee: Mervento Oy, Vaasa (FI)

( * ) Notice: Subject to any disclaimer, the term of this patent is extended or adjusted under 35 U.S.C. 154(b) by 51 days.

(21) Appl. No.: 13/504,837

(22) PCT Filed: Oct. 29, 2009

(86) PCT No.: PCT/FI2009/050865
§ 371 (c)(1),
(2), (4) Date: May 21, 2012

(87) PCT Pub. No.: WO2011/051538
PCT Pub. Date: May 5, 2011

(65) Prior Publication Data
US 2012/0235420 A1    Sep. 20, 2012

(51) Int. Cl.
*F03D 11/00* (2006.01)
*F03D 7/02* (2006.01)

(52) U.S. Cl.
CPC .......... *F03D 11/0008* (2013.01); *Y02E 10/723* (2013.01); *Y02E 10/722* (2013.01); *F03D 7/0204* (2013.01)
USPC .......................................................... 290/55

(58) Field of Classification Search
USPC .......................................................... 290/55
See application file for complete search history.

(56) References Cited

U.S. PATENT DOCUMENTS

| | | | | |
|---|---|---|---|---|
| 2,388,377 A * | 11/1945 | Albers | ............................. | 290/55 |
| 2,454,058 A * | 11/1948 | Hays | .............................. | 60/398 |
| 6,800,956 B2 * | 10/2004 | Bartlett | ............................. | 290/55 |
| 8,174,144 B2 * | 5/2012 | Nies | ................................. | 290/55 |
| 8,178,991 B2 * | 5/2012 | Smith | .............................. | 290/55 |
| 8,469,664 B2 * | 6/2013 | Madge et al. | ..................... | 416/9 |
| 2003/0147751 A1 | 8/2003 | Wobben | | |

(Continued)

FOREIGN PATENT DOCUMENTS

DE       4426444 A1 *   2/1996
DE    100 11 464 C1    8/2001

(Continued)

*Primary Examiner* — Joseph Waks
(74) *Attorney, Agent, or Firm* — Birch, Stewart, Kolasch & Birch, LLP

(57) ABSTRACT

Wind power station, which includes a vertical tower (1), a rotor that includes a hub part (18) and blades (16) that is fitted to the top end of the tower and that is aligned into the wind and rotated by the wind, a rotor shaft (11), which transmits rotating motion to a generator (12, 13, 14) connected to the aforementioned shaft in a direct-drive power station and to a gear box in a geared power station, and also a revolving frame (10) that is fitted to the top end of the tower (1) on bearings so as to rotate around the vertical axis (17), in which frame the rotor shaft (11) is also mounted on bearings. For mounting the revolving frame (10) on bearings onto the top part of the tower, the top part of the tower (1) includes a first bearing (5) or (20) that mainly bears at least the vertical load coming from the revolving frame (10), as well as a second bearing (9) or (19) disposed at a distance H from the aforementioned bearing, in which case one of the bearings (9), (19) bears mainly the radial load coming from the revolving frame and in which case the support of the upper one of the aforementioned bearings (9), (19, 20) is arranged by means of a support piece leaving the tower and fitted inside the revolving frame.

10 Claims, 2 Drawing Sheets

(56) References Cited

U.S. PATENT DOCUMENTS

Figure 1:
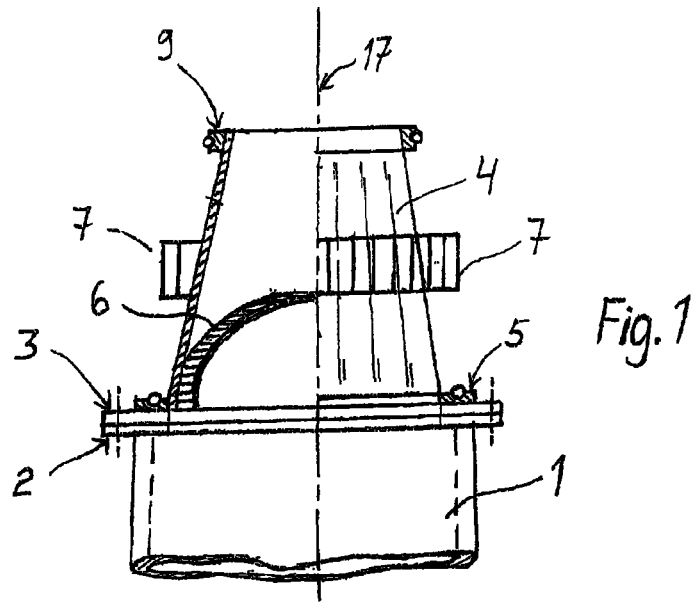

| | | | |
|---|---|---|---|
| 2008/0084068 A1* | 4/2008 | Shibata et al. | 290/44 |
| 2010/0092120 A1* | 4/2010 | Nies et al. | 384/513 |
| 2010/0140948 A1* | 6/2010 | Segovia et al. | 290/55 |
| 2010/0303623 A1* | 12/2010 | Dawoud et al. | 416/44 |
| 2011/0012360 A1* | 1/2011 | Numajiri | 290/55 |
| 2011/0031755 A1* | 2/2011 | Numajiri | 290/55 |

FOREIGN PATENT DOCUMENTS

| | | |
|---|---|---|
| EP | 1 925 820 A1 | 5/2008 |
| FR | 2929345 A1 * | 10/2009 |
| WO | WO 2008/074322 A2 | 6/2008 |

* cited by examiner

WIND POWER STATION

The invention relates to a wind power station, which comprises a vertical tower, a rotor that comprises a hub part and blades that is fitted to the top end of the tower and that is aligned into the wind and rotated by the wind, a rotor shaft, which transmits rotating motion to a generator connected to the aforementioned shaft in a direct-drive power station and to a gear box in a geared power station, and also a frame that is fitted to the top end of the tower on bearings so as to rotate around the vertical axis, in which frame the rotor shaft is also mounted on bearings.

Known from prior art are wind power stations in which the alignment of the rotor blades and the other apparatuses of the top part of the tower, such as the rotor shaft, occurs either by rotating the whole tower on a base that is on the surface of the ground or with a bearing fitted to the top part of the tower, resting on which bearing the top part can be rotated by means of a slewing mechanism around the vertical axis according to the wind. If the whole tower of the wind power station rotates, a bearing that enables rotation of the tower as well as a slewing mechanism must be made in the base in the proximity of the ground surface. If the tower is fixed and only a unit at the end of the tower is rotated, an appropriate bearing and slewing mechanism must be fitted to the top end of the tower. This type of bearing is nowadays implemented by means of a slewing ring provided with roller balls/rolls, in which case all the parts intended to rotate in addition to the rotor blades are disposed in that unit, which is positioned to rest on the slewing ring.

In addition to loading directed downwards, considerable tilting force is exerted on the slewing ring owing to the wind and to masses that are disposed asymmetrically, which tilting force endeavors to tip the whole unit off the slewing ring. The force of the wind inclines backwards when the rotor is stopped, while the deadweight inclines forwards. As a consequence, the slewing ring must also be provided against loading directed upwards. This type of bearing, which functions in both axial directions, is an awkward solution, because it inevitably results in the use of two bearings, of which one bears downward loads and the other upward loads. The slewing ring system must be tightened from time to time, and replacing it, or parts of it, is a large and difficult procedure. The aforementioned two bearings must be one on top of the other and very close to each other, because the horizontal rotor shaft and the generator are disposed almost immediately above the slewing ring system.

When using a slewing ring solution, replacement of a bearing only succeeds by lifting the whole top part (nacell) down, which is an expensive operation, especially in large wind power plants and especially in offshore conditions.

A new wind power plant has been developed to eliminate the drawbacks described above, with which surprisingly the structure of in particular wind power plants in the higher output power range is improved in terms of being more installation-friendly and service-friendly. The wind power plant according to the invention is characterized in that for mounting the revolving frame on bearings onto the top part of the tower, the top part of the tower comprises a first bearing that mainly bears at least the vertical load coming from the revolving frame, as well as a second bearing disposed at a distance H from the aforementioned bearing, in which case one of the bearings bears mainly the radial load coming from the revolving frame and in which case the support of the upper one of the aforementioned bearings is arranged by means of a support piece leaving the tower and fitted inside the revolving frame.

One advantage of the wind power station of the invention is that the revolving frame can be lowered from above in the installation phase directly into position resting on the lower slewing ring. Installation with this method succeeds best if the upper bearing is an axial bearing, i.e. one that bears a vertical load, and at the same time a radial bearing is connected to it. The second lower bearing is purely a radial bearing, which prevents the unit from tipping and leaning. The lower bearing can with the solution according to the invention be taken a distance H downwards from the upper bearing, in which case it is structurally simple e.g. as a radial sliding bearing. In particular the solution of the invention can be used if the rotor shaft and the generator are disposed on the same side with respect to the rotation center of the revolving frame and at such a distance from the aforementioned rotation center that the support piece needed for the bearing of the revolving frame can be e.g. a symmetrical piece with respect to the aforementioned rotation center. The solution according to the invention also gives the possibility of arranging walkways on the inside and on the outside of the revolving frame as well as inside the support piece.

Another advantage is that when using sliding bearings it is possible to replace the bearing shells in the top part without lifting any heavy structural part down with a crane.

Figure 2:
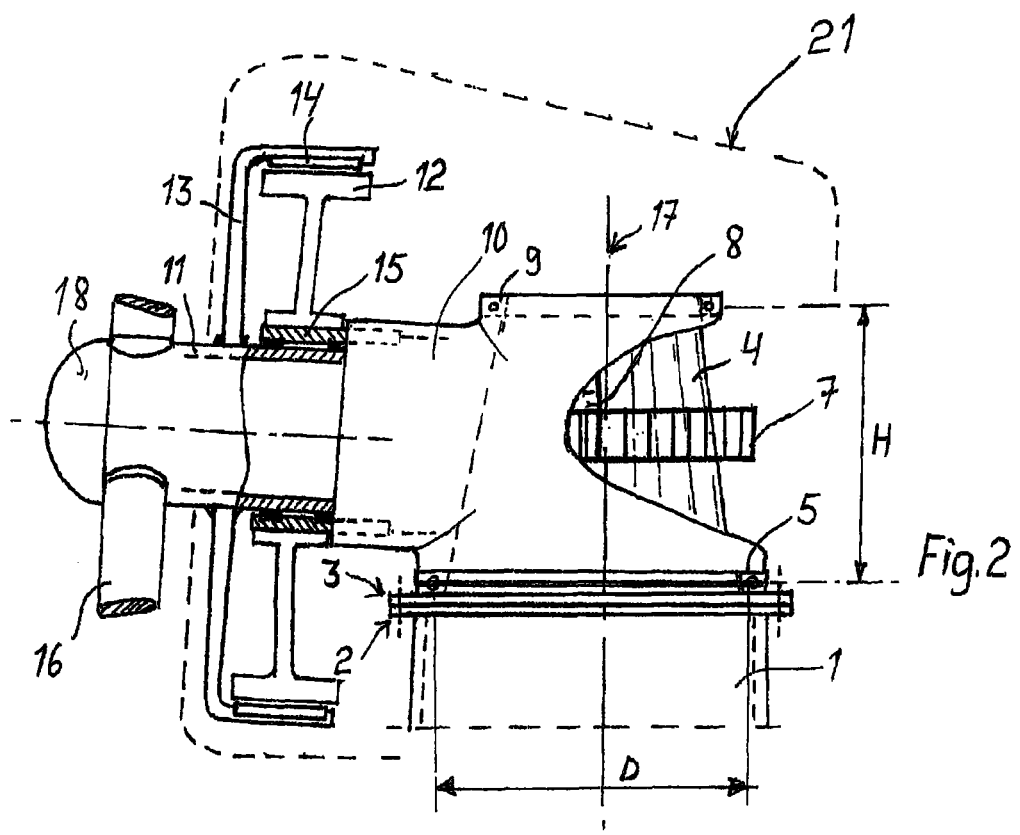
Figure 3:
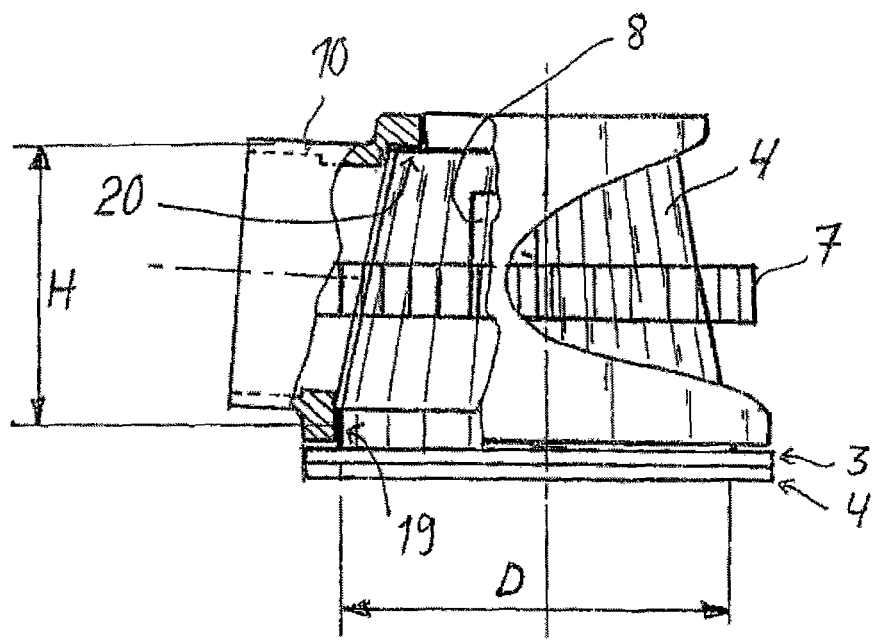

In the following, the invention will be described in more detail with reference to the attached drawing, wherein FIG. 1 presents a partially sectioned view of the support piece of a bearing connected to the top part of a tower of a wind power station, FIG. 2 presents a revolving frame solution of the top part of a wind power station fitted on top of the support piece of FIG. 1, FIG. 3 presents a partially sectioned view of a revolving frame with sliding bearing.

FIG. 1 presents a support piece 4 of a bearing securely fixed by means of the joints between the flanges 2 and 3 to the top part of the tower 1 of a wind power station, which support piece is a conical hollow welded or cast piece and comprises a lower bearing 5, which is a slewing ring, and also an upper bearing 9, which is a radial bearing. Stairs 6 and one or more doors 8, via which it is possible to exit from the flank of the support piece 4, are disposed inside the support piece. A service platform 7 is also on the outside of the piece. The support piece 4 is symmetrical in relation to the centerline 17.

FIG. 2 presents a revolving frame 10, being a part of the wind power station structure, installed on top of the support structure 4 of FIG. 1. Since the support structure 4 is conical, the revolving frame can be lowered from above onto the support piece. The revolving frame 10 is most suitably an integral welded structure or casting, comprising three round bearing housings or housing preforms and also, to save material and to create walkways, a lightening aperture in the direction (on the right in the figure) in which there is not a bearing housing.

Since the support piece 4 is conical and hollow, it is possible to be inside it and to pass via it to the hub space, to inside the revolving frame 10 and farther to inside the hollow shaft 11 or to elsewhere. A slewing ring bearing 5 (in FIGS. 1 and 2 a roller bearing) is between the flange 3 of the bottom part of the support piece 4 and the bottom part of the revolving frame 10. A radial bearing 9 (in FIGS. 1 and 2 a roller bearing) is between the top part of the support piece 4 and the revolving frame 10. This upper bearing 9 is smaller in diameter than the lower bearing 5, and prevents the power station unit from tipping off the top of the lower bearing 5. In order for the bearing loadings to be reasonable, the distance measurement H between the bearings 5 and 9 is at least 70% of the length of the bearing diameter D of the lower bearing 5. Most suitably the distance measurement H is, however, over 100% of the aforementioned bearing diameter D.

A bearing of the revolving frame 10 according to the invention is possible when the rotor shaft 11 ends before the flank of the support piece 4. Owing to this the generator must also be in the area of the shaft 11. The rotor 13 of the generator contains permanent magnets 14 and the rotor is fixed to rotate directly along with the shaft 11. The rotor can be a segmented structure. The stator 12 is fixed to a bushing 15 coming from the revolving frame 10. The bushing 15 functions at the same time as a bearing housing of the bearing of the shaft 11. The stator 12 can also be a segmented structure.

The section above the lower bearing 5 or of the upper bearing 9, except for the blades 16 and the hub 18, is provided with an enclosure 21, such as a plastic shell part, which is partially described in FIG. 2, so that the equipment unit of the top part, which unit contains among other things the generator, a possible transformer, a frequency converter, the rotator devices of the revolving frame 10, the cooling arrangement of the generator and the hydraulic unit, becomes relatively impervious and can be separated, e.g. from the high interior space of the tower frame 1, into its own chamber. The plastic shell part 21 is most suitably also a one-piece structure that is lowered onto the top part from above.

FIG. 3 presents a bearing of the revolving frame 10 using sliding bearings, in which case the lower bearing 19 is a radial bearing and the upper bearing 20 is an axial bearing. The radial bearing 19 is also in connection with the upper bearing 20. The revolving frame 10 can easily be lowered to rest on the bearings from directly above. The sliding bearings 19, 20 are divided into sector parts so that they can be replaced without removing the revolving frame 10.

The invention claimed is:

1. A wind power station, comprising a vertical tower, a rotor that comprises a hub part and blades that is fitted to the top end of the tower and that is aligned into the wind and rotated by the wind, a rotor shaft, which transmits rotating motion to a generator connected to the rotor shaft in a direct-drive power station or to a gear box in a geared power station, and also a revolving frame that is fitted to the top end of the tower on bearings so as to rotate around the vertical axis, in the revolving frame the rotor shaft being mounted on bearings, wherein a top part of the tower comprises a first bearing that mainly bears at least a vertical load coming from the revolving frame, and a second bearing disposed at a distance H from the first bearing, the second bearing bears mainly a radial load coming from the revolving frame, and the support of the upper one of the first and second bearings is arranged by means of a support piece leaving the tower and fitted inside the revolving frame, and wherein the revolving frame has a bushing receiving the rotor shaft therein.

2. The wind power station according to claim 1, wherein the upper bearing is smaller in diameter than the lower bearing.

3. The wind power station according to claim 1, wherein the support piece is a conical piece securely fixed to the top end of the tower.

4. The wind power station according to claim 1, wherein the revolving frame is an integral piece, which comprises bearing housings or fixing locations of the bearing housings, for the lower bearing, for the upper bearing and also for the bearing of the rotor shaft.

5. The wind power station according to claim 1, wherein the distance (H) between the lower and the upper bearing is at least 70% of the bearing diameter (D) of the lower bearing.

6. The wind power station according to claim 1, wherein the first and second bearings are sliding bearings and can be replaced in their operating location in the top part of the power station.

7. The wind power station according to claim 1, wherein a service space is arranged between the revolving frame and the support piece.

8. The wind power station according to claim 1, wherein the revolving frame can be lowered from above into its position resting on an axial bearing.

9. The wind power station according to claim 1, wherein the revolving frame is a casting.

10. The wind power station according to claim 1, wherein a shell of the top part is a single piece.

* * * * *